May 28, 1957
E. E. ROBERGE
2,793,639
BODY ORIFICIALSCOPES
Filed Dec. 9, 1952
2 Sheets-Sheet 1
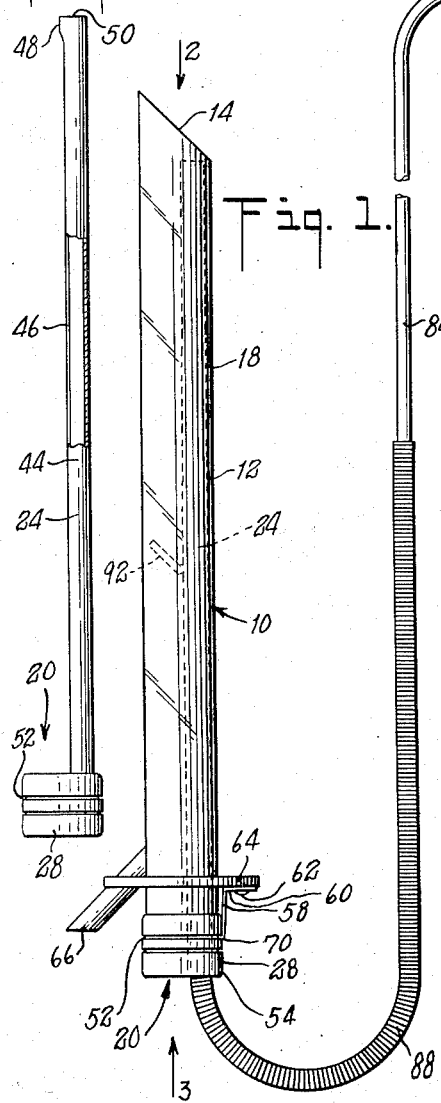
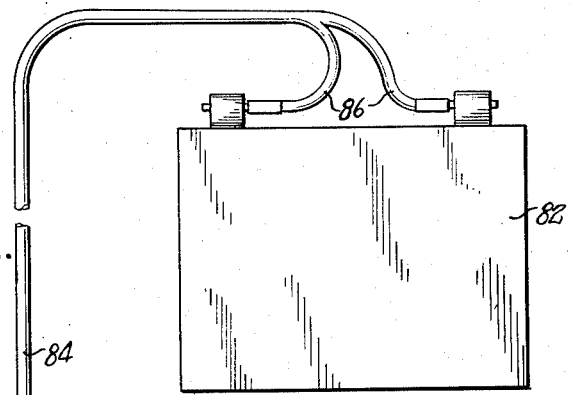
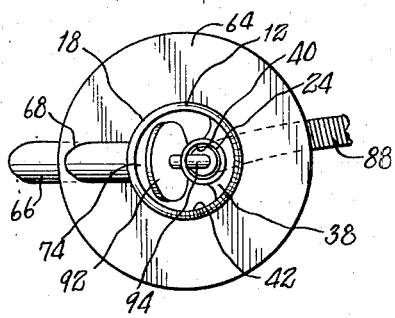
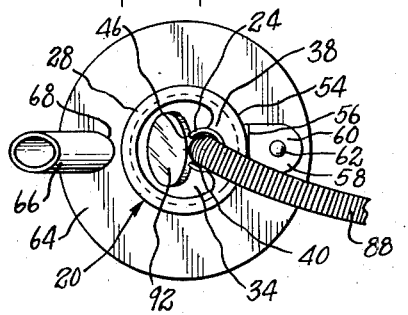
INVENTOR.
EDMOND E. ROBERGE
BY
Henry L. Burkitt
ATTORNEY May 28, 1957  E. E. ROBERGE  2,793,639
BODY ORIFICIALSCOPES
Filed Dec. 9, 1952  2 Sheets-Sheet 2
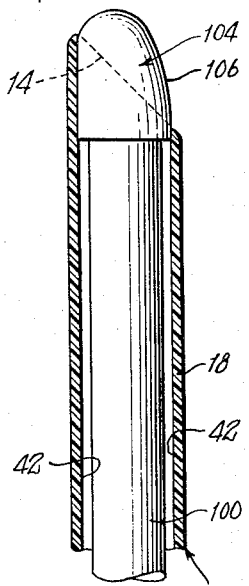
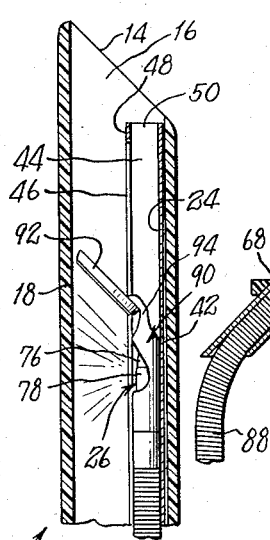
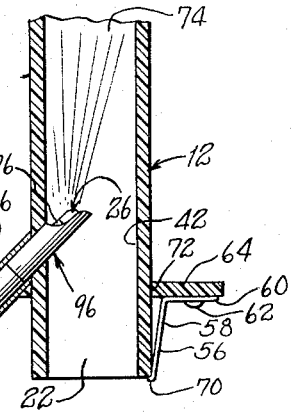
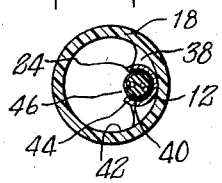
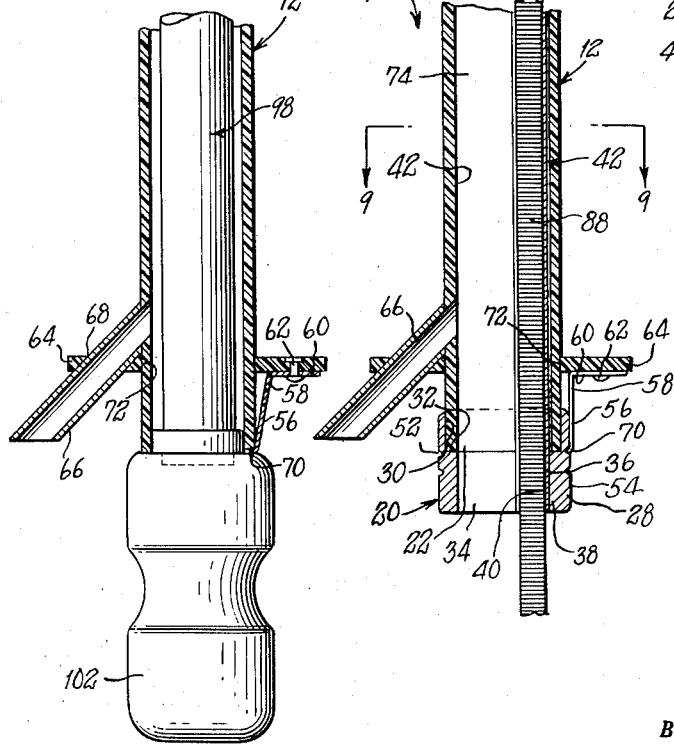
INVENTOR.
EDMOND E. ROBERGE
BY Henry L. Burkitt
ATTORNEY

United States Patent Office

2,793,639
BODY ORIFICIALSCOPES

Edmond E. Roberge, Brooklyn, N. Y., assignor of fifty percent to Henry L. Burkitt, Flushing, N. Y.

Application December 9, 1952, Serial No. 324,881

14 Claims. (Cl. 128—6)

This invention relates generally to body orificialscopes. More particularly, it relates to an improved sigmoidoscope.

An object of the invention is the provision of a sigmoidoscope which has means whereby any desired portion of the rectal area may be illuminated selectively, for the visual examination thereof, by guided direction of a light source.

Another object of the invention is to provide a sigmoidoscope with transparent walls, so that, by controlled improved illuminating means, the entire rectal wall, in contact with the transparent wall of the sigmoidoscope, may be examined.

Another object of the invention is to provide a sigmoidoscope of the type indicated wherein a source of illumination and an examining device may be positioned with facility to examine any part of the rectum by reason of the substantially unobstructed interior, with unaffected cross-section for the working area.

Another object of the invention is to provide a transparent sigmoidoscope which is simple and inexpensive in construction, easy to sterilize, and highly efficient in the accomplishment of its intended purposes.

The invention is herein described in relation to an instrument such as a sigmoidoscope. It may have applications, however, to instruments functioning in substantially the same manner, and for like purposes, with relation to other passages.

Other objects, features, and advantages of the invention will be set forth hereinafter, or will be apparent from the description and the drawings, in which is illustrated an embodiment of constructions for carrying out the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, within the scope of the claims appended hereto.

On the drawings, in which the same reference characters refer to the same parts throughout, and in which is disclosed such a practical construction:

Fig. 1 is a side elevational view of a sigmoidoscope embodying features of the invention, the light source being shown connected to a current source;

Fig. 1a is an elevational view of the insert member, without the light source, which otherwise is shown assembled in Fig. 1, part of the tube being broken away;

Fig. 2 is an end view of the sigmoidoscope as seen from the end indicated by the arrow 2 in Fig. 1;

Fig. 3 is an end view similar to Fig. 2, but as seen from the end as indicated by the arrow 3 in Fig. 1;

Fig. 4 is a detail elevational view of a portion of the light source, shown separated from other associated parts of the sigmoidoscope, showing the manner in which mirror and reflector are associated with the source;

Fig. 5 is a side elevational view of the parts shown in Fig. 4, parts of the light source and the conductor being broken away to disclose details of structure;

Fig. 6 is a view in section of the sigmoidoscope shown in Fig. 1, but without the light source and associated parts, but with an assembled element to permit ready insertion into the rectum, the parts being to enlarged scale, the assembled element being shown in elevation;

Fig. 7 is a view of the sigmoidoscope similar to Fig. 6, but in this case the assembled element being removed and a light source and associated parts being shown in their positions during the operation of the device for examination after insertion has been effected;

Fig. 8 is a view similar to Fig. 7, but of only a portion of the sigmoidoscope, and with parts of Fig. 7 removed and the light source shown associated with the sigmoidoscope in a different relationship;

Fig. 9 is a detail cross-sectional view, substantially on the line 9—9 of Fig. 7, illustrating one relationship of the parts of the sigmoidoscope for inspecting part of the rectal region; and Fig. 10 is a view similar to Fig. 4, showing a modified form of light source.

On the drawings is depicted a sigmoidoscope 10 which may include a tubular member 12, both ends of which are open. The member may be formed from any suitable relatively transparent material, as, for example, the transparent plastic known as "Lucite." The end edge 14 of member 12 at opening 16 is inclined, this being the end which is intended to be inserted first into the body orifice to be examined, as, for instance, past the sphincter muscles at the anus. Devices similar to sigmoidoscope 10 may be designed for examination and treatment at various openings into the body; the instrument to be described is especially advantageous in the examination and treatment of the rectal region.

When member 12 has been entered properly into the rectum, the tissues forming the walls of the sigmoidal passage will be substantially in direct contact with the outer face of wall 18 of member 12. As shown assembled, in Fig. 7, with member 12, a guide 20 is provided to be inserted through open end 22 of member 12. Guide 20, which includes an open-ended tube 24, functions as a longitudinally extending support and guiding member for a light source 26, to provide means for illuminating any selected portion of wall 18, as described further herein.

Guide 20 is constructed and provided with means to mount it releasably in member 12; for this purpose, tube 24 may be securely held by means such as a sleeve 28. In one form, a member such as sleeve 28 may have a portion 30 of its bore dimensioned to be complementary to the external diameter of member 12. A shoulder or abutment 32 is formed intermediately of passage 34 through sleeve 28 to define a stop to limit movement of sleeve 28 over end 22. Within passage 34, suitable means may be provided to anchor tube 24 at its end 36 to sleeve 28. For instance, a boss 38 may be formed, or may be secured in place, within passage 34. Boss 38 may be mounted to dispose a passage 40, extending therethrough, eccentrically with relation to passage 34. Boss 38 may be provided as a separate piece, secured in place, as, for instance, by brazing, to sleeve 28, or it may be a single piece. Likewise, tube 24 may be secured at end 36, within passage 40, by any suitable means such as brazing.

When sleeve 28 is assembled with member 12 in the manner shown in Figs. 1 and 7, tube 24 has its axis eccentrically disposed with relation to the axis of member 12, and then tube 24 preferably is closely adjacent to the interior face 42 of wall 18. By mounting tube 24 in this manner, passage 34 is left substantially unobstructed for a large part of its cross-section.

Tube 24 may be provided with an opening in its wall 44; the opening may take the form of a longitudinal slot 46; as seen from Fig. 9, the slot opens inwardly substantially in the direction of the diameter of sleeve 28 on which it is disposed. The slot may be continuous from end 36 to a portion 48 at the opposite end 50 of tube 24. When sleeve 28 is positioned within member 12, relative rotation of these parts may be effected. By such rotation, tube 24 may be positioned so that slot 46 is directed toward any portion of face 42.

Sleeve 28 may be provided with any suitable means to retain it assembled with member 12, and yet permit the relative rotation specified. One means for this purpose is shown as including a peripherally extending groove 52 on the outer face of wall 54. Into such groove is intended to be received the depending portion 56 of a spring finger 58. Finger 58 may be secured in place with relation to member 12 by any suitable means; it may include a base portion 60, secured, by any suitable means, as, for example, by a rivet 62, to a collar 64. Collar 64 is shown mounted on member 12, and held in place by being fitted on branch portion 66, which extends through an opening 68 provided for that purpose.

From portion 60 of finger 58 extends portion 56 at the end of which is formed a prong 70 which is adapted to ride in groove 52 as relative rotation of sleeve 28 and member 12 is effected; yet slight lateral movement of sleeve 28 will be sufficient to separate prong 70 from groove 52 to effect release of the sleeve from its relation with member 12.

Sleeve 28 may readily be assembled with member 12 by pushing prong 70 laterally the small amount necessary to slide sleeve 28 between portion 56 and wall 18, and then sliding prong 70 until it engages in groove 52. Collar 64 may be formed of any suitable material, and is centrally apertured as indicated at 72, the diameter of the aperture being complementary to the outside diameter of member 12.

Branch portion 66 is adjacent end 22. The axis of branch portion 66 may be disposed to form an acute angle with the longitudinal axis of member 12; thus portion 66 may be in unobstructed communication with passage 74 of member 12. Portion 66 has an interior diameter substantially the same as that of tube 24, and is adapted for the reception of light source 26 to support and guide it for a purpose to be described further.

Light source 26 may include a bulb 76 disposed in a holder 78 which may include a socket. The holder may be threaded internally for engagement with a threaded fitting 80 which may provide terminals for electrically connecting bulb 76 to a source of current 82. A two-wire conductor 84 is electrically connected to fitting 80; each of the wires 86 of the conductor is connected, at the opposite end of said conductor, to a terminal of source 82 which may take the form of a conventional dry cell battery. Conductor 84 may be housed, for a portion of its length, in a flexible metallic casing 88 which rigidifies the conductor. The end of the casing may be soldered or otherwise secured to fitting 80. If desired, a switch may be interposed at any convenient point in the electrical circuit to control the current flow to bulb 76.

It will be noted from the above that bulb 76 and holder 78 are detachably secured to fitting 80, so that either the bulb, or the holder, or both, may be changed readily. Holder 78 preferably has a reflector portion 90 formed or otherwise provided therewith; portion 90 may be of sufficient extent to cooperate with the entire filament of the bulb, and partially to surround the latter. Reflector 90 thus serves to reflect light from bulb 76 to any selected portion of wall 18 of member 12, in a manner which will be described in detail hereinafter. Light source 26 may also be provided with a mirror 92, preferably of the magnifying type. This mirror is secured to holder 78 by an arm 94 which extends through slot 46 so that mirror 92 may direct its image down through the unobstructed portion of passage 74.

As previously noted, light source 26 is adapted to be received in tube 24, as shown in Figs. 1 and 7; holder 78 likewise is dimensioned to be complementary to the inner dimensions of tube 24. After sleeve 28 and member 12 are assembled, light source 26 may be threaded into tube 24 through end 36, arm 94 of holder 78 being positioned to be guided into slot 46. Insertion and positioning of the light source is effected by using casing 88 as manual control for that purpose.

The light source may be moved axially to any desired position relative to member 12 by pushing and pulling casing 88. Similarly light source 26 may be rotated to illuminate any portion of wall 18 by manually rotating sleeve 28. Reflector 90 is positioned relatively to the bulb 76 so as to reflect light rays through slot 46 to any desired portion of wall 18. Mirror 92, positioned at an appropriate angle, directs an image of the illuminated portion of wall 18 down through passage 74 to the operator looking into end 22 at sleeve 28. Light source 26 is retained against rotation with relation to tube 24 by engagement of arm 94 through slot 46.

Thus light source 26 may be disposed selectively to direct its rays to any portion of wall 18, thus to illuminate any desired area of the rectum, for visual examination, since the source is both axially adjustable by manipulation of casing 88, and rotatably adjustable by rotation of sleeve 28. Reflector 90 directs light from bulb 76 to the desired area; mirror 92 simultaneously directs an image of the illuminated area for visual observation. Since member 12 is transparent, the entire rectal wall in contact with the instrument may be illuminated and examined.

In relation to the arrangement shown in Fig. 10, light source 26 has had its mirror 92 removed, and a hood 96 having a reflector substituted for holder 78. Light source 26 may, in this form, be received in branch portion 66, as shown in Fig. 8, for reflecting light axially of member 12 towards end edge 14. Source 26 now may serve to illuminate rectal regions adjacent end edge 14 of member 12 when the member is operatively associated with a patient. Hood 96 and holder 78 preferably are constructed to be interchangeable, so that either holder or hood may be connected to fitting 80. Source 26, with hood 96, is adjustable both axially and rotatably with relation to portion 66.

To permit the easy insertion of member 12 into an orifice of the body without injury and with the least discomfort to the patient, and insertion device or obturator 98 (Fig. 6) may be assembled in member 12. Obturator 98 may comprise a longitudinally extending rod 100 having a handle 102 secured to one end, and a plug 104 connected to its opposite end. The obturator is adapted to be positioned within member 12 when member 12 is being inserted into the patient's body orifice. As shown in Fig. 6, the outer arcuate surface 106 of plug 104 is smoothly contoured, and closes off the end of member 12 at end edge 14, the plug being dimensioned to be complementary to that end of member 12. After member 12 is properly positioned in the body orifice, obturator 98 is withdrawn by pulling on handle 102 axially outwardly.

In usual procedure, the obturator is positioned in member 12 before insertion; then partial insertion is made. The obturator is withdrawn; now light source 26 with hood 96 is inserted through branch 66 in order to provide the necessary illumination as member 12 is manipulated through the passage, so as to have sufficient illumination to prevent injury to the tissues. At the same time, a partial examination is made. When member 12 has been fully inserted, hood 96 is removed from branch 66, and is replaced by holder 78 with its mirror 92. Guide 20 is assembled with member 12, after which holder 78 and its mirror 92 are threaded into tube 24 in association with slot 46. Guide 20 is turned to any desired position;

holder 78 and its associated members are slid along the tube so that a minute examination of any part of the tissues may be effected; for this purpose, mirror 92 may be a magnifying mirror. Now either the entire apparatus may be removed as a unit, or guide 20 may be removed sparately, and then member 12 may be retracted, after hood 96 has been reassembled, and reinserted into branch 66.

Many other changes could be effected in the particular construction, and in the methods of use, within the scope of the invention defined herein.

What I claim is new and useful is:

1. An instrument for use in visually examining the interior of an organ of the human body, the instrument comprising a tubular member, means extending longitudinally through the member to provide a guiding passage, the means having a slot opening from the passage to the interior of the member for at least a portion of the length of the member, a light source, and means carrying and extending from the light source, the light source and the carrying means being removably positioned in the passage, the carrying means having a terminal portion positioned externally of the passage and the member, the light source and the carrying means having an effective cross-section substantially the same as that of the passage, the terminal portion comprising means for sliding the carrying means and the light source carried thereby along the passage and in association with the slot to locate the light source at any selected position lengthwise of the passage and the slot, the passage and the slot being eccentrically located with relation to the bore of the member.

2. An instrument for use in visually examining the interior of an organ of the human body, the instrument comprising a tubular member for insertion into the interior of the organ, a guide having a passage therethrough and light-passing means opening from the passage through a wall of the guide, a light source, and means carrying and extending from the light source, the light source and the carrying means being removably positioned in the passage, the carrying means having a terminal portion positioned externally of the guide, the light source and the carrying means having an effective cross-section substantially the same as that of the passage, the guide being removably assembled in the bore of the member, the guide, when assembled in the bore, being adjustable to present the light-passing means to direct light from the source in the passage to selected portions of the inner face of the walls of the member, and means between the guide and the member retaining the guide and the member against separation when the guide is assembled in the bore while permitting adjustment of the guide with relation to the bore, the terminal portion comprising means for sliding the carrying means and the light source carried thereby along the passage to locate the light source at any selected position lengthwise of the guide.

3. An instrument for use in visually examining the interior of an organ of the human body, the instrument comprising a transparent tubular member for insertion into the interior of the organ, a guide having "a passage" therethrough and light-passing means opening from the passage through a wall of the guide, a light source, means carrying and extending from the light source, the light source and the carrying means being removably positioned in the passage, the carrying means having a terminal portion positioned externally of the guide, the light source and the carrying means having an effective cross-section substantially the same as that of the passage, the guide having an effective cross-section to slide fit with and being removably assembled in the bore of the member, the guide, when assembled in the bore, being adjustable while positioned in and with relation to the bore, the light source and the carrying means therefor being slidable lengthwise of he passage to direct light through the light-passing means at selected positions along the length of the guide and through selected portions of the walls of the member, the terminal portion comprising means for sliding the carrying means and the light source carried thereby along the passage to locate the light source at any selected position lengthwise of the guide, and means carried by the guide and positioned externally of the member when the guide is assembled in said bore and when the member is inserted into the interior of an organ for adjusting the guide with relation to the member to change the light direction effectiveness of the light-passing means.

4. An instrument for use in visually examining the interior of an organ of the human body, the instrument comprising a transparent tubular member for insertion into the interior of the organ, a guide having a passage therethrough and light-passing means opening from the passage through a wall of the guide at least for a portion of the length of the guide, a light source, and means carrying and extending from the light source, the light source and the carrying means being removably positioned in the passage, the carrying means having a terminal portion positioned externally of the guide, the light source and the carrying means having an effective cross-section substantially the same as that of the passage, the guide being removably assembled in the bore of the member, the guide, when assembled in said bore, being adjustable with relation to the bore, the light source and the carrying means therefor being slidable lengthwise of the passage to direct light through the light-passing means at selected positions along the length of the guide and through selected portions of the walls of the member, means between the guide and the member retaining the guide and the member against separation when the guide is positioned in the bore of the member, the retaining means permitting adjustment of the guide while positioned in and with relation to the bore, the terminal portion comprising means for sliding the carrying means and the light source carried thereby along the passage to locate the light source at any selected position lengthwise of the guide.

5. An instrument for use in visually examining the interior of an organ of the human body, the instrument comprising a transparent tubular member for insertion into the interior of the organ, a guide having a passage therethrough and light-passing means opening from the passage through a wall of the guide, a light source, means carrying and extending from the light source, the light source and the carrying means being removably positioned in the passage, the carrying means having a terminal portion positioned externally of the guide, the light source and the carrying means having an effective cross-section substantially the same as that of the passage, the guide being removably assembled in the bore of the member, the guide, when assembled in said bore, being adjustable with relation to the bore to present the light-passing means to direct light from the source in the passage to selected portions of the inner face of the walls of the member, the terminal portion comprising means for sliding the carrying means and the light source carried thereby along the passage to locate the light source at any selected position lengthwise of the guide, and reflector means carried with the light source to reflect light through the light-passing means.

6. An instrument for use in visually examining the interior of an organ of the human body, the instrument comprising a transparent tubular member for insertion into the interior of the organ, a guide having a passage therethrough and an opening from the passage through a wall of the guide, a light source, means carrying and extending from the light source, the light source and the carrying means being removably positioned in the passage, the carrying means having a terminal portion positioned externally of the guide, the light source and the carrying means having an effective cross-section substantially the same as that of the passage, the guide being removably assembled in the bore of the member, the light source and the carrying means therefor, when the guide is assembled in said bore and when the light source and the carrying means therefor are positioned in the passage, being slidable lengthwise of the passage to direct light through the opening at selected positions along the length of the guide and through selected portions of the walls of the member, the terminal portion comprising means for sliding the carrying means and the light source carried thereby along the passage to locate the light source at any selected position lengthwise of the guide, reflector means carried with the light source to reflect rays through the opening, and a mirror carried by the light source for projecting an image of an illuminated portion of the interior of the organ longitudinally through and to a position outside of the tubular member.

7. An instrument for use in visually examining the interior of an organ of the human body, the instrument comprising a transparent tubular member for insertion into the interior of the organ, the member having a branch extending angularly with relation to and communicating with the interior of the member, a guide having a passage therethrough and light-passing means opening from the passage through a wall of the guide, a light source, means carrying and extending from the light source, the light source and the carrying means having an effective cross-section substantially the same as that of the passage and of the bore of the branch, the guide being removably assembled in the bore of the member, the light source and the carrying means therefor, when the guide is assembled in said bore and when the light source and the carrying means therefor are positioned in the passage, being slidable lengthwise of the passage to direct light through the light-passing means at selected positions along the length of the guide and through selected portions of the walls of the member, the light source, when positioned by the carrying means in the branch bore, directing light through the bore of the member, means retaining the guide and the member against separation when the guide is assembled in the member bore while permitting adjustment of the guide with relation to the member bore, the light-source-carrying means providing means for positioning the light source selectively in and for moving the light source to any selected position lengthwise of the passage or of the branch, the source, when located in the branch, illuminating opposite end portions of the bore of the member.

8. An instrument for use in visually examining the interior of an organ of the human body, the instrument comprising a hollow transparent tubular member for insertion into the interior of the organ, the member having at least one open end, a tubular support removably inserted into the bore of the member through said open end, the support having a passage therethrough and an opening from the passage extending lengthwise of and through a wall of the support into said bore, a light source, means carrying and extending from and movable with the light source, the light source and the carrying means having an effective cross-section substantially the same as that of the passage, the support being adjustable within the bore, the light source and the carrying means therefor being removably positioned in and being slidable lengthwise of the passage to direct light through the opening at selected positions along the length of the support and through selected portions of the walls of the member, means between the guide and the member retaining the support and the member against separation, the retaining means permitting adjustment of the support with relation to the bore while it is positioned in the bore.

9. An instrument for use in visually examining the interior of an organ of the human body, the instrument comprising a hollow transparent tubular member for insertion into the interior of the organ, the member having at least one open end, a tubular support removably inserted into the bore of the member through said open end, the support having a passage therethrough and an opening from the passage extending lengthwise of and through the wall of the support into said bore, a light source, and means carrying and extending from and movable with the light source, the light source and the carrying means having an effective cross-section substantially the same as that of the passage, the support being adjustable within the bore, the light source and the carrying means therefor being removably positioned in and being slidable lengthwise of the passage to direct light through the opening at selected positions along the length of the support and through selected portions of the walls of the member.

10. An instrument for use in visually examining the interior of an organ of the human body, the instrument comprising a hollow transparent tubular member for insertion into the interior of the organ, the member having at least one open end, a tubular support removably inserted into the bore of the member through said open end, means carrying the tubular support and interfitting with the bore of the tubular member and locating the support eccentrically with relation to the bore of the member when the support is inserted into said bore, the support having a passage therethrough and an opening from the passage extending lengthwise of and through a wall of the support into said bore, a light source, and means carrying and extending from and movable with the light source, the light source and the carrying means having an effective cross-section substantially the same as that of the passage, the support being adjustable with the bore, the light source and the carrying means therefor being removably positioned in and being slidable lengthwise of the passage to direct light through the opening at selected positions along the length of the support and through selected portions of the walls of the member, the tubular-support-carrying means and the member having means retaining the support and the member against separation when the support is inserted into said bore while permitting adjustment of the support with relation to the bore.

11. An instrument for use in visually examining the interior of an organ of the human body, the instrument comprising a hollow transparent tubular member for insertion into the interior of the organ, the member having at least one open end, a tubular support removably inserted into the bore of the member through said open end, the support having an open end at the same end as the open end of the tubular member, means carrying the tubular support and interfitting with the bore of the tubular member and locating the support eccentrically with relation to the bore of the member when the support is inserted into said bore, the support having a passage therethrough and an opening from the passage extending lengthwise of and through a wall of the support into said bore, a light source, and means carrying and extending from and movable with the light source, the light source and the carrying means having an effective cross-section substantially the same as that of the passage, the light source and the carrying means therefor being removably assembled with the support by insertion through the support open end into the passage, the support being adjustable within the bore, the light source and the carrying means therefor being movable lengthwise of the passage to direct light through the opening at selected positions along the length of the support and through selected portions of the walls of the member, the tubular-support-carrying means and the member having means retaining the support and the member against separation when the support is inserted into said bore while permitting adjustment of the support with relation to the bore.

12. An instrument for use in visually examining the interior of an organ of the human body, the instrument comprising a hollow transparent tubular member for insertion into the interior of the organ, the member having at least one open end, a tubular support removably inserted into the bore of the member through said open end, the support having an open end at the same end as the open end of the tubular member, means carrying the tubular support and interfitting with the bore of the tubular member and locating the support eccentrically with relation to the bore of the member when the support is inserted into said bore, the support having a passage therethrough and an opening from the passage extending lengthwise of and through a wall of the support into said bore, a light source, and means carrying and extending from and movable with the light source, the light source and the carrying means having an effective cross-section substantially the same as that of the passage, the light source and the carrying means therefor being removably assembled with the support by insertion through the support open end into the passage, the support being adjustable within the bore, the light source and the carrying means therefor being movable lengthwise of the passage to direct light through the opening at selected positions along the length of the support and through selected portions of the walls of the member, the tubular-support-carrying means and the member having means retaining the support and the member against separation when the support is inserted into said bore while permitting adjustment of the support with relation to the bore, reflector means carried with the light source to reflect light through the opening through the walls of the member when the light source is assembled in the passage, a mirror, and means carried by the light source and extending therefrom through the opening and supporting the mirror in the bore of the member outside of the passage when the light source is assembled in the passage, the mirror constituting means for projecting an image of an illuminated portion of the interior of the organ longitudinally through the bore to a position exteriorly of the tubular member.

13. An instrument for use in visually examining the interior of an organ of the human body, the instrument comprising a hollow transparent tubular member for insertion into the interior of the organ, the member having at least one open end, a tubular support removably inserted into the bore of the member through said open end, the support having an open end at the same end as the open end of the tubular member, means carrying the tubular support and interfitting with the bore of the tubular member and locating the support eccentrically with relation to the bore of the member when the support is inserted into said bore, the support having a passage therethrough and an opening from the passage extending lengthwise of and through a wall of the support into said bore, a light source, and means carrying and extending from and movable with the light source, the carrying means comprising flexible electrical conductors to connect the light source to an electric current source, the light source and the carrying means having an effective cross-section substantially the same as that of the passage, the light source and the carrying means therefor being removably assembled with the support by insertion through the support open end into the passage, the support being adjustable within the bore, the light source and the carrying means therefor being movable lengthwise of the passage to direct light through the opening at selected positions along the length of the support and through selected portions of the walls of the member, the tubular-support-carrying means and the member having means retaining the support and the member against separation when the support is inserted into said bore while permitting adjustment of the support with relation to the bore, reflector means carried with the light source to reflect light through the opening through the walls of the member when the light source is assembled in the passage, a mirror, and means carried by the light source and extending therefrom through the opening and supporting the mirror in the bore of the member outside of the passage when the light source is assembled in the passage, the mirror constituting means for projecting an image of an illuminated portion of the interior of the organ longitudinally through the bore to a position exteriorly of the tubular member.

14. An instrument for use in visually examining the interior of an organ of the human body, the instrument comprising a hollow transparent tubular member for insertion into the interior of the organ, the member having at least one open end, the member having a branch extending angularly with relation to and communicating with the interior of the member adjacent to said open end, a tubular support removably inserted into the bore of the member through said open end, the support having an open end at the same end as the open end of the tubular member, the support having a passage therethrough and an opening from the passage extending lengthwise of and through a wall of the support into said bore at least for a portion of the length of the support, a light source, means carrying and extending from and movable with the light source, the carrying means comprising flexible electrical conductors to connect the light source to an electric current source, the light source and the carrying means having an effective cross-section substantially the same as that of the passage and of the bore of the branch, the light source and the carrying means therefor being removably assembled with the support by insertion through the support open end into the passage or into the branch, the support being adjustable within the bore of the member, the light source and the carrying means therefor being movable lengthwise of the passage to direct light through the opening at selected positions along the length of the support and through selected portions of the walls of the member or through the branch into the bore of the member, the light-source-carrying means constituting means for adjusting the carrying means and the light source carried thereby to any selected position lengthwise of the passage or of the branch, and reflector means carried with the light source to reflect light through the opening and through the walls of the member, the reflector means controlling the direction of light in the bore of the member when the light source is assembled in the branch bore.

References Cited in the file of this patent

UNITED STATES PATENTS

| 218,055 | Nitze | July 29, 1879 |
| 951,285 | Meyer | Mar. 8, 1910 |
| 1,286,083 | Pennington | Nov. 26, 1918 |

FOREIGN PATENTS

| 470,965 | France | Oct. 8, 1914 |
| 610,466 | France | June 8, 1926 |
| 811,985 | Germany | July 8, 1949 |
| 831,440 | France | June 7, 1938 |